Sept. 16, 1941.  S. KYROPOULOS  2,256,118
METHOD AND APPARATUS FOR REDUCING WEAR ON LUBRICATED BEARING SURFACES
Filed Jan. 13, 1939
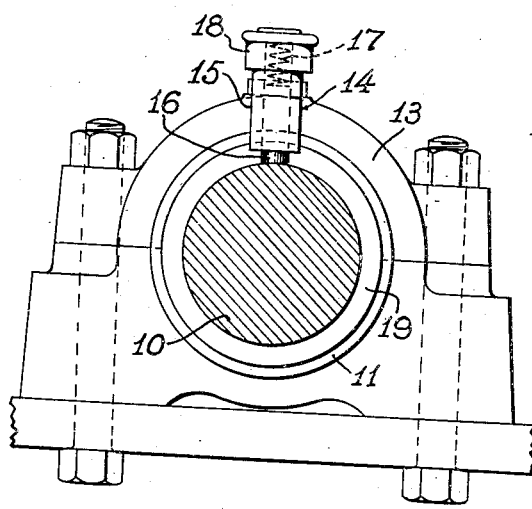
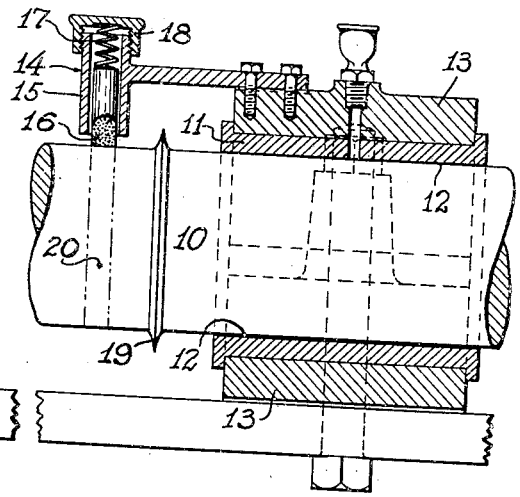
INVENTOR.
Spiro Kyropoulos
BY Philip Subkow
ATTORNEY.

UNITED STATES PATENT OFFICE 2,256,118

METHOD AND APPARATUS FOR REDUCING WEAR ON LUBRICATED BEARING SURFACES

Spiro Kyropoulos, Pasadena, Calif., assignor to Union Oil Company of California, Los Angeles, Calif., a corporation of California Application January 13, 1939, Serial No. 250,710

7 Claims. (Cl. 184—1)

This invention relates to the lubrication of moving bearing surfaces and particularly to the preservation and reduction of wear of moving bearing surfaces separated by a lubricant such as oil.

The desirable characteristics of oil have been summed up in the rather indefinite term of "oiliness," the two principal characteristics of which are manifested in the reduction of friction and prevention of wear of relatively moving bearing surfaces. The coefficients of friction of rubbing bearing surfaces when lubricated with oils which cover a wide range of types and qualities, vary only a few percent. However, the other desirable property of the lubricants, that is, their ability to prevent wear of the bearing surfaces varies widely and thus becomes a more important factor in the consideration of lubricants than their relative resultant frictional coefficients.

It has been discovered that the oiliness characteristics of a lubricant such as oil, in so far as its wear prevention characteristics are concerned, are dependent upon an electrical phenomenon which is a feature of the invention described hereinafter.

In most mechanism the series of various moving elements of which it is comprised are effectively separated and more or less electrically insulated from one another by the film or layer of lubricant lying between the various bearing surfaces. Consequently there is usually no continuous path through the moving parts of the mechanism and around the said bearing surface thereof through which an electrical current can flow.

It is found that consequently two such mechanism bearing surfaces in relative motion and separated by an oil film such as is maintained in conventional hydrodynamic lubrication, tend to become electrically charged with respect to one another and in the absence of special means to prevent it, an electrostatic field is built up and is maintained between the bearing surfaces and through the intervening layer or film of said lubricating oil.

Bearing surfaces, even those well run-in under moderate loads with suitable lubricants are never ideally smooth and in fact present surfaces having great numbers of sharp peaks and valleys as revealed upon microscopic or profilographic inspection. When two such bearing surfaces move, one relative to the other, collisions occur between the projecting peaks of material where the intervening oil film becomes sufficiently thin under the concentrated loading at these points, resulting in breaking off of quantities of minute particles of the bearing surface material. These, thus removed particles of bearing material, inherently assume an electrical charge and under the electrodynamic force of the electrostatic field between the bearing surfaces, migrate through the lubricating oil layer toward the bearing surfaces of opposite polarity and become deposited and adhere thereto under the influence of the said electrostatic field. The deposited particles will thus form additional projecting peaks on the bearing surfaces which in turn afford additional opportunities for collision between such peaks.

The wear particles which are thus caused to accumulate on the bearing surfaces appear to agglomerate to form larger bodies which intermittently bridge the lubricating oil filled gap between the moving bearing surfaces resulting in causing elongated cuts or scratches upon the opposite bearing surfaces over which they move with resultant removal of further quantities of material from the bearing surfaces. These cuts and scratches while usually microscopic in size individually, in the aggregate over substantial periods of time manifest themselves in the phenomenon, recognized as bearing wear.

It has accordingly been discovered that the accumulation of these detrimental wear particles upon the moving bearing surfaces, and bearing wear associated therewith, can be substantially reduced by providing means to prevent the occurrence or maintenance of the beforementioned electrostatic field between the bearing surfaces and through the intervening lubricating oil layer. Thus, with respect to the wear characteristics, it has been found possible to effectively control the apparent oiliness of any given lubricating oil by the elimination of the said electrostatic field which largely prevents the accumulation of the detrimental wear particles upon the bearing surfaces and allows them to be readily washed away from the vicinity of the bearing surfaces with the flow of the lubricant.

An illustrative embodiment of this invention is shown as applied to a typical journal and bearing, the end view and side-sectional elevation of which appears on Figures 1 and 2 respectively.

A journal or shaft 10 is adapted to rotate within a bearing 11 upon a lubricating film illustrated at 12. The bearing 11 is supported and backed by means of a frame-work 13. Supported from and electrically attached to the frame 13 is a brush holder 14 comprising a cylindrical container 15 holding a carbon brush 16. The carbon brush 16 is adapted to be forced into electrical contact with the surface of the journal 10 by means of the compression spring 17 acting under the container cap 18. An oil barrier ring 19 is preferably positioned on the journal 10 at a point intermediate the bearing and the brush contact area 20.

The operation of the apparatus of the invention is as follows: As described hereinbefore the relative rotational movement of the bearing surface of the journal 10 with respect to the external bearing surface 11 generates opposite electrostatic charges which accumulate on the said journal 10 and bearing surfaces 11 and thus tend to produce an electric field through the intervening oil film 12. The electrostatic charges, however, may be prevented from accumulating in quantities sufficient to build up an appreciable electric field across the lubricating oil layer in the bearing by providing a conductive path between the said bearing 11 and the journal 10 by way of the electrical connection formed by the bearing frame 13, brush holder 14, carbon brush 16 to the journal surfaces.

Contact of the brush 16 is preferably made on a portion of the journal surfaces as shown at 20 which is substantially free from the lubricant whereby positive electrical contact is assured, and the oil barrier 19 is shown by way of illustration as a means of maintaining the said partial contact area of the journal free from oil which might otherwise reach it from the bearing surfaces. Oil which runs outward on the journal 10 from the bearing upon reaching the barrier 19 is thrown off by the centrifugal force of its rotation.

While a simple brush is illustrated in the drawing as a means for maintaining equal potential conditions in the bearing other types of connections may obviously be employed. Where the bearing surfaces are in relative rotation, any suitable form of sliding or rolling contact may be provided on condition that the contacting surfaces may be maintained sufficiently free from lubricant or other insulating fluids to insure a positive electrical connection between one bearing surface and the other. Where the bearing surfaces are in relative reciprocating motion a positive flexible connection of suitable type may be employed.

This invention is particularly advantageous in its application to high speed internal combustion engines such as employed in automotive and airplane service to prolong the life of crankshaft, and connecting rod bearings and to aid in preservation of the piston ring and cylinder wall surfaces.

The foregoing is merely illustrative of one embodiment of the method and apparatus and is not to be limited thereby but may include any method and apparatus which accomplishes the same within the scope of the claims.

I claim:

1. A method of increasing the effective oiliness of a body of lubricating oil between two relatively moving bearing surfaces comprising maintaining said moving bearing surfaces at equal electric potentials.

2. A method of increasing the effective oiliness of a body of lubricating oil between two relatively moving bearing surfaces comprising maintaining said moving bearing surfaces at equal electrical potentials by providing an electrically conductive path in parallel with said body of lubricating oil.

3. A method of increasing the effective oiliness of a body of lubricating oil between two relatively moving bearing surfaces comprising maintaining an electrically conductive circuit between said relatively moving bearing surfaces.

4. Apparatus comprising in combination a pair of bearing surfaces and means to maintain a layer of lubricating oil between said bearing surfaces and means to prevent electrostatic charges from accumulating on said bearing surfaces in the form of an electrically conductive circuit between the bearing surfaces.

5. Apparatus according to claim 4 in which said means to prevent the accumulation of electrostatic charges comprises a brush contact completing an electrical circuit between said relatively moving bearing surfaces.

6. Apparatus comprising in combination a bearing, a member movable in said bearing, means to maintain a layer of lubricating oil between the opposed surfaces of said bearing and said movable member, and means to maintain said bearing and said movable member at equal electric potentials.

7. Apparatus according to claim 6 wherein the electric means includes a device to complete an electric circuit between said surfaces.

SPIRO KYROPOULOS.